US010816126B2

(12) United States Patent
Tuck et al.

(10) Patent No.: US 10,816,126 B2
(45) Date of Patent: Oct. 27, 2020

(54) MODULAR SPLIT SLEEVE

(71) Applicant: The Pipe Line Development Company, Westlake, OH (US)

(72) Inventors: Jerry Tuck, Lorain, OH (US); Aaron Z. Louden, Lakewood, OH (US); Glenn Beard, North Olmsted, OH (US)

(73) Assignee: THE PIPE LINE DEVELOPMENT COMPANY, Westlake, OH (US)

( * ) Notice: Subject to any disclaimer, the term of this patent is extended or adjusted under 35 U.S.C. 154(b) by 342 days.

(21) Appl. No.: 15/872,262

(22) Filed: Jan. 16, 2018

(65) Prior Publication Data

US 2019/0219213 A1    Jul. 18, 2019

(51) Int. Cl.
*F16L 55/172* (2006.01)
*F16L 21/06* (2006.01)
*F16L 9/22* (2006.01)

(52) U.S. Cl.
CPC .......... *F16L 55/172* (2013.01); *F16L 21/065* (2013.01); *F16L 9/22* (2013.01); *F16L 55/1725* (2013.01)

(58) Field of Classification Search
CPC .... F16L 55/172; F16L 21/065; F16L 55/1725
USPC ....... 285/373, 419, 368, 415, 15, 16; 138/99
See application file for complete search history.

(56) References Cited

U.S. PATENT DOCUMENTS

| 427,658 A | * | 5/1890 | Bayles | F16L 23/14 285/405 |
| 631,867 A | * | 8/1899 | Beaver | F16L 55/172 138/99 |
| 633,607 A | * | 9/1899 | O'Malley | F16L 55/172 138/99 |
| 640,183 A | * | 1/1900 | Dresser | F16L 37/0925 285/339 |
| 672,955 A | | 4/1901 | Murrin | |
| 732,400 A | * | 6/1903 | Dresser et al. | F16L 55/172 138/99 |
| 1,329,522 A | * | 2/1920 | Griffin | B65G 53/52 137/15.08 |
| 1,331,988 A | * | 2/1920 | Griffin | F23J 3/06 285/16 |
| 1,668,855 A | * | 5/1928 | Ludlum | E02F 3/90 406/153 |
| 1,940,729 A | * | 12/1933 | Pfefferle | F16L 55/172 285/337 |
| 2,402,868 A | * | 6/1946 | Boyle | F16L 23/02 285/336 |

(Continued)

FOREIGN PATENT DOCUMENTS

CN      104676191 A      6/2015

*Primary Examiner* — David Bochna
(74) *Attorney, Agent, or Firm* — Pearne & Gordon LLP

(57)  ABSTRACT

A fitting for encasing an extended length of pipe comprising a plurality of segments jointed end-to-end to axially extend over the length of pipe, each of the segments being formed by a pair of mating semi-cylindrical sections, the pairs of mating sections having arcuate ends forming longitudinally extending opposed faces mating at a diametral plane, the longitudinal opposed faces being sealed together, the adjacent axial ends of the segments being circumferentially sealed together, ends of the fitting having internal seals arranged to contact and seal onto the exterior of the pipe whereby the space between said internal seals within said fitting is closed.

4 Claims, 3 Drawing Sheets

(56) References Cited

U.S. PATENT DOCUMENTS

| | | | | |
|---|---|---|---|---|
| 2,775,469 A | * | 12/1956 | Brown | F16L 41/06 285/18 |
| 2,899,984 A | * | 8/1959 | Gaffin | F16L 55/172 138/99 |
| 3,017,204 A | | 1/1962 | Smith | |
| 3,078,108 A | | 2/1963 | Smith | |
| 3,954,288 A | * | 5/1976 | Smith | F16L 55/175 285/93 |
| 4,096,886 A | | 6/1978 | Daspit | |
| 4,111,234 A | * | 9/1978 | Wells | F16L 55/172 138/167 |
| 4,652,023 A | * | 3/1987 | Timmons | F16L 55/172 138/99 |
| 4,747,723 A | * | 5/1988 | Hasley | F16D 1/0864 403/337 |
| 4,840,194 A | * | 6/1989 | Berry | H02G 3/06 138/109 |
| 6,131,957 A | * | 10/2000 | Saito | F16L 21/04 285/133.21 |
| 6,220,302 B1 | * | 4/2001 | Nolley | F16L 55/103 138/99 |
| 6,237,640 B1 | * | 5/2001 | Vanderlee | B29C 65/342 138/162 |
| 6,305,719 B1 | * | 10/2001 | Smith, Jr. | F16L 55/172 285/15 |
| 7,900,655 B2 | * | 3/2011 | Morton | F16L 55/172 138/99 |
| 8,210,210 B2 | * | 7/2012 | Clark | F16L 55/172 138/99 |
| 8,424,925 B2 | * | 4/2013 | Smith | F16L 55/172 285/15 |
| 8,961,017 B2 | * | 2/2015 | Muilenburg | B23P 6/00 138/167 |
| 2011/0023975 A1 | | 2/2011 | Clark et al. | |
| 2011/0089679 A1 | * | 4/2011 | Meredith | F16L 55/175 285/15 |

* cited by examiner

MODULAR SPLIT SLEEVE

BACKGROUND OF THE INVENTION

The invention relates to repair fittings for pipelines.

PRIOR ART

Split sleeve repair fittings have been used for decades to stop actual or anticipated leakage from a compromised pipeline while the line remains in service. Such repair fittings typically take the form of two mating cylindrical half shells assembled around a damaged area of the pipe and bolted together across a diametral plane. The half shells are mutually sealed at their mating radial faces and cooperate to circumferentially seal on the exterior of the pipe, ordinarily, adjacent each end of the fitting. Examples of prior art split fittings are disclosed, for example, in U.S. Pat. Nos. 3,017,204, 3,078,108 and 3,954,288.

Typically, split sleeve repair fittings are useful in stopping leakage at a localized damaged area of a pipeline. There remains a need for a practical system for encasing extended lengths of a compromised pipeline while allowing the line to remain in service. In some situations, for example, a pipeline for a production facility may become weakened by corrosion, fatigue, abrasion, or the like, and due to unavoidable production demands or mechanical stresses that might be placed on parts in the event of a shutdown, the piping system cannot be taken out of service.

SUMMARY OF THE INVENTION

The invention provides a modular split sleeve system which can be assembled to provide any desired extended length. The system uses an axial series of interconnecting segments or units such that the length of an installation is determined by the number of segments used.

The inventive system, besides providing custom lengths, has many additional advantages. Component parts or segments can be inventoried in sufficient numbers for immediate delivery of a required repair length. This is particularly important where an emergency situation arises unexpectedly. The individual segments are relatively easy to fabricate, ship, and install when compared to what would otherwise be required for a full length device, assuming that the latter would even be practical.

In the disclosed arrangement, the extended modular repair sleeve is constructed of a series of split sleeve segments each bolted to the adjacent sleeve segment or segments. Only the end segments need be fitted with circumferential pipe engaging seals. Intervening segments are simply sealed with their adjacent segments thereby avoiding the need for cleaning the section of pipe to be encased other than at ends of the modular repair assembly.

The split sleeves or segments can be assembled on a pipe with the separation plane of the segment halves of one segment being angularly displaced with respect to the separation planes of the adjacent segments. This can strengthen the extended unit and simplify assembly of bolts used to secure pairs of adjacent segments together.

DESCRIPTION OF THE PREFERRED EMBODIMENT

Figure 1:
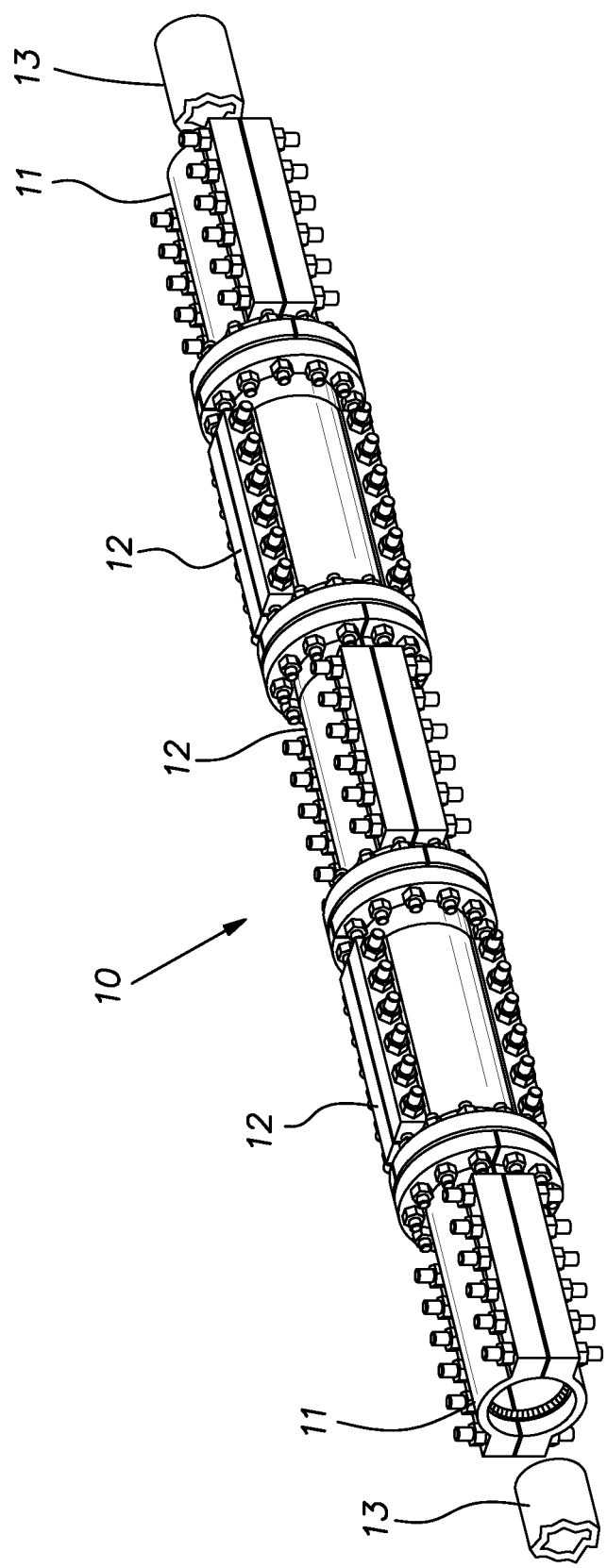
FIG. 1 is a perspective view of a modular pipe repair fitting constructed in accordance with the invention.

A repair fitting 10 of the invention, comprises a coaxial series of segments 11, 12. The segments 11, 12 are of a number sufficient when joined end-to-end to encase a specified length of pipe 13. The length of pipe 13 may be compromised, for example, by corrosion, abrasion, impact, fatigue, excessive pressure, unexpected stress, or other factor, making it susceptible to leakage. In the illustrated example, end segments 11 are identical to one another and intermediate segments 12 are identical to one another. Except for internal seals, discussed below, the segments and fasteners holding them together are typically made of steel or other suitable metal.

Each segment 11, 12 comprises a pair of semi-cylindrical shells or halves so that the segment is split across a diametral plane. The segment halves 21, 22 can be a casting, forging, or, in most cases, a weldment.

Figure 2:
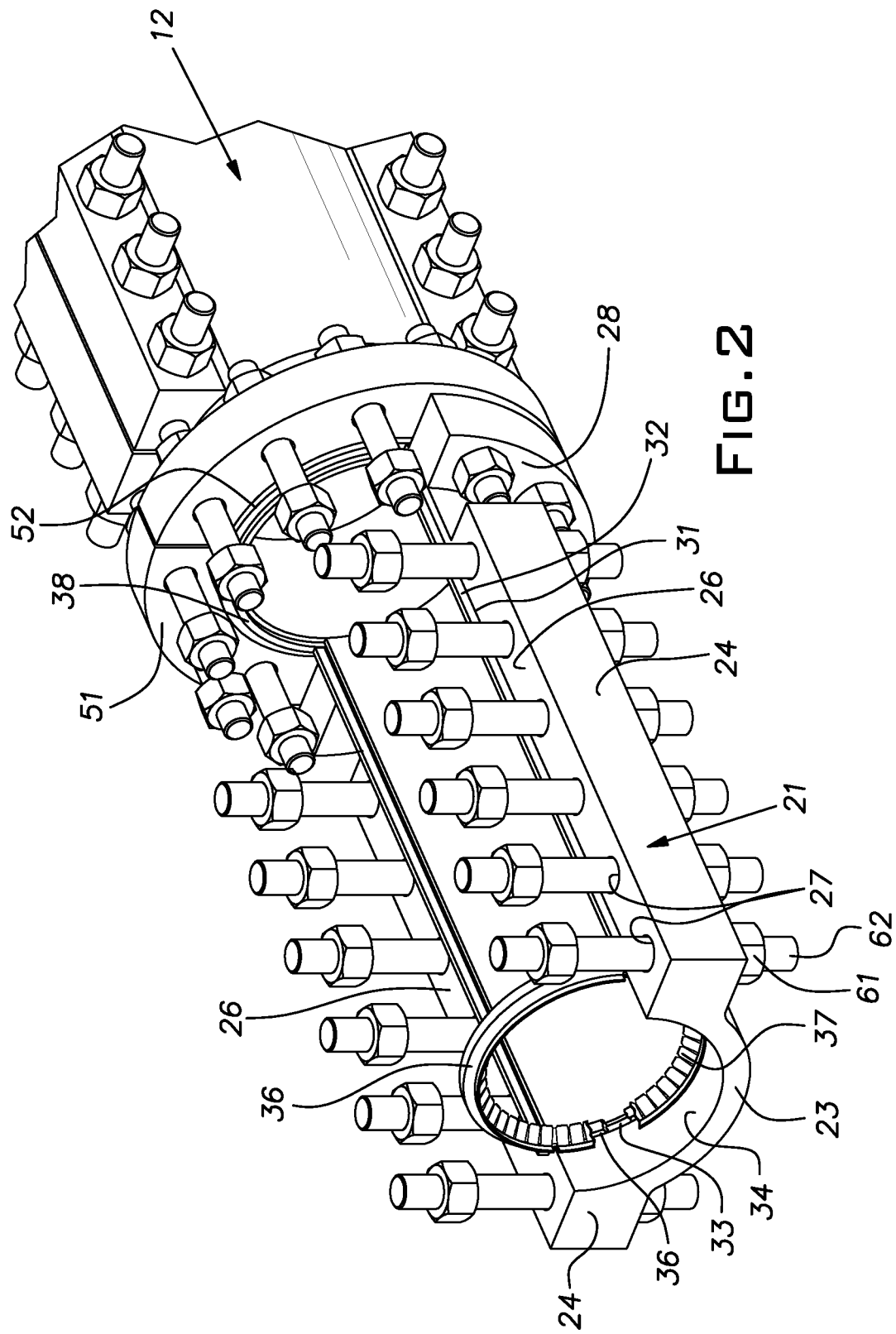
FIG. 2 is a fragmentary perspective view of one end of the repair fitting of FIG. 1.

FIG. 2 illustrates an end half segment 21, it being understood that an opposite half segment is identical to the illustrated half segment. The half segment 21 comprises a semi-cylindrical or arcuate axially extending wall 23 having longitudinal flanges 24 at its arcuate ends. The flanges 24 have faces 26 that when assembled with a respective opposing half segments are at or immediately adjacent a diametral plane of the segment 11. The flanges 24 have spaced through bolt holes 27 perpendicular to the faces 26.

At an axially inner end, the half segment 21 has a radially extending semi-circular flange 28 with axially oriented through bolt holes 29. The longitudinal flanges 24 are spaced axially from the radial flange 28.

Longitudinal grooves 31 in the flange faces 26 inward of the bolt holes 27, receive elongated elastomeric seals 32 of a material suitable for use with the fluid and temperatures in the pipe being encased. Adjacent an outer end of the half segment 21, the grooves 31 communicate with a semi-circular groove 33 in an interior surface 34 of the half section 21. A semi-circular seal 36, again of a suitable elastomeric material, is assembled in the groove 33. An arcuate girder ring section 37 formed by a notched thin steel band is welded to the interior surface 34 axially outward of the groove 33. The girder ring section 37, which conforms to the exterior of the pipe 13 being encased serves to axially retain the seal 36 against fluid pressure within the segment 11 developed by any fluid leakage from the pipe. Ends of the longitudinal seals 32 are in contact with the arcuate pipe seals 36 and with arcuate elastomeric seals 38, also of suitable material disposed between the radial flange 28 and an abutting flange of an intermediate segment 12.

Figure 3:
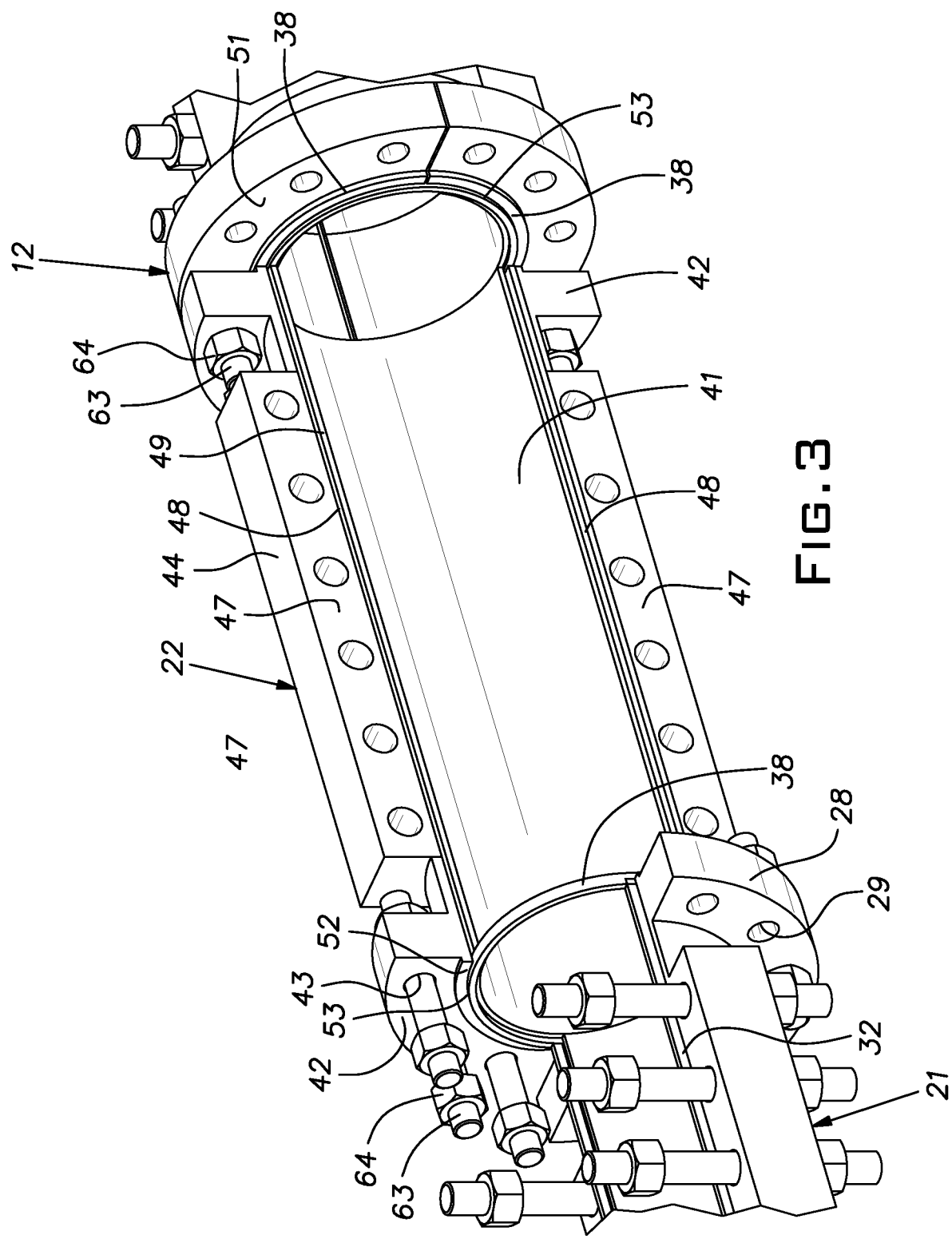
FIG. 3 is a fragmentary perspective view of an intermediate length of the repair fitting of FIG. 1.

FIG. 3 illustrates a typical intermediate half segment 22. The half segment 22 includes an elongated semi-cylindrical shell 41 having a semi-circular radially extending flange 42 on each axial end. The flanges 42 have axially oriented through bolt holes 43. Along each arcuate end of the shell 41 is a longitudinally extending flange 44. The longitudinal flanges are spaced from each of the respective radial flanges 42 and have through bolt holes 46 at diametral faces 47.

Arcuate end faces of the shell 41 have longitudinal grooves 48 for reception of elastomeric seals 49. Axial outward faces 51 of the radial flanges 42 have concentric annular ribs 52. A concentric groove 53 in the rib 52 receives the arcuate elastomeric seal 38. Each end segment radial flange 28 has a similar rib and seal receiving groove. Ends of the longitudinal seals 49 are in contact with the arcuate seals 38.

When mating half segments 21 or 22 are assembled together they form a circular shell with an inside diameter larger than the outside diameter of the pipe 13 to be encased. The fitting 10 can be installed over a pipe 13 starting at one end segment 11. The half segments 21 are positioned on opposite sides of the pipe 13 and are drawn tightly together with nuts 61 and bolts 62 assembled through aligned holes 27. This process causes the arcuate seals 36 to seal on the outside surface of the pipe 13. Prior to assembly, the pipe exterior may be cleaned in the intended location of the seals 36 at both ends of the fitting 10. Upon tightening the nuts 61 on the bolts 62 and constriction of the arcuate seals 36 onto the pipe 13, the end segment 11 is effectively fixed on the pipe. The longitudinal seals 32 adjacent the longitudinal flanges 24 are compressed and effect a seal therebetween and a seal with the arcuate seals 38.

Thereafter, an intermediate segment 12 is assembled over the pipe 13 next to the inner end of the first installed end segment 11. This involves assembly and tightening of bolts 62 with nuts 61 in aligned flange holes 46. Preferably, the angular orientation of the diametral plane between the half segments 22 is 90 degrees out of alignment with the diametral plane between the halves 21 of the end segment 11. The first intermediate segment is fixed to the end segment 11 by assembling bolts 63 in aligned radial flange holes 29, 43 and tightening nuts 64 on these bolts.

Subsequent intermediate segments 12 are installed, typically one at a time, along the compromised portion of the pipe 13 in the same manner as described for the first intermediate segment 12. Each intermediate segment 12 preferably has its diametral plane of separation oriented so that it is 90 degrees from the plane of an abutting segment. The last installed end segment 11 is installed preferably again with its separation plane 90 degrees from that of the adjacent intermediate segment 12. The end segment radial flanges 28 should be abutted with the radial flanges 42 of the adjacent intermediate section 21 before the bolts 62 and nuts 61 are tightened and draw the seals 37 onto the pipe exterior. The intermediate segments 12 when installed are effectively free of restriction by engagement with the pipe 13.

In the foregoing description, the mating faces of the semi-cylindrical segment walls and the mating faces of the radial flange ribs are each provided with a seal receiving groove. As described, each groove carries its own seal. However, a single seal can be proportioned to seal in opposed grooves or only a single groove can be provided between mating faces.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A fitting for encasing an extended length of pipe comprising a plurality of segments jointed end-to-end to axially extend over the length of pipe, each of the segments being formed by a pair of mating semi-cylindrical sections, the pairs of mating sections having arcuate ends forming longitudinally extending opposed faces mating at a diametral plane, the longitudinal opposed faces being sealed together, the adjacent axial ends of the segments being circumferentially sealed together, ends of the fitting having internal seals arranged to contact and seal onto the exterior of the pipe whereby the space between said internal seals within said fitting is closed, the segments having radial end flanges, the end flanges of adjacent segments being fixed together by common bolts, the radial flanges of adjacent segments being sealed by intermediate arcuate seals.

2. A fitting as set forth in claim 1, wherein segments inward of the fitting ends are effectively axially free of restriction by engagement with the exterior of a pipe on which the fitting is installed.

3. A fitting as set forth in claim 1, wherein the semi-cylindrical sections have radially extending longitudinal flanges at or adjacent the diametral plane, the flanges of mating sections having a plurality of aligned bolt holes, the mating sections being held together in place relative to one another by bolts assembled in said aligned bolt holes.

4. A fitting for encasing an extended length of pipe comprising a plurality of segments jointed end-to-end to axially extend over the length of pipe, each of the segments being formed by a pair of mating semi-cylindrical sections, the pairs of mating sections having arcuate ends forming longitudinally extending opposed faces mating at a diametral plane, the longitudinal opposed faces being sealed together, the adjacent axial ends of the segments being circumferentially sealed together, ends of the fitting having internal seals arranged to contact and seal onto the exterior of the pipe whereby the space between said internal seals within said fitting is closed, the diametral plane of adjacent segments being 90 degrees out of alignment.

\* \* \* \* \*